United States Patent [19]
Kuhl

[11] Patent Number: 5,807,065
[45] Date of Patent: Sep. 15, 1998

[54] APPARATUS FOR AUTOMATICALLY UNSTACKING HORIZONTAL LID MEMBERS FROM A VERTICALLY EXTENDING STACK THEREOF

[76] Inventor: Jeffrey B. Kuhl, 61 Kuhl Rd., Flemington, N.J. 08822

[21] Appl. No.: 784,628

[22] Filed: Jan. 21, 1997

[51] Int. Cl.⁶ .................................................. B65G 59/04
[52] U.S. Cl. .................. 414/796.7; 414/752; 414/795.7; 414/796.4; 414/797
[58] Field of Search ................................ 414/752, 792.9, 414/793, 795.6, 795.7, 796.4, 796.7, 797

[56] References Cited

U.S. PATENT DOCUMENTS

| | | | |
|---|---|---|---|
| 2,856,079 | 10/1958 | Watter | 414/752 |
| 3,884,278 | 5/1975 | Nakashima | 414/752 X |
| 3,912,070 | 10/1975 | Cronk et al. . | |
| 4,221,519 | 9/1980 | Nord et al. . | |
| 4,355,939 | 10/1982 | Musgrave | 414/413 |
| 4,403,900 | 9/1983 | Thomas . | |
| 4,509,638 | 4/1985 | Kato et al. | 414/752 X |
| 4,588,341 | 5/1986 | Motoda . | |
| 4,592,692 | 6/1986 | Suizu et al. . | |
| 4,619,173 | 10/1986 | Göransson et al. | 414/797 X |
| 4,642,013 | 2/1987 | Mundus et al. . | |
| 4,648,771 | 3/1987 | Yoshioka . | |
| 4,710,089 | 12/1987 | Schneider . | |
| 4,768,913 | 9/1988 | Baba . | |
| 4,820,103 | 4/1989 | Dorner et al. | 414/790 |
| 4,824,308 | 4/1989 | Carboniero et al. | 414/797 |
| 4,865,515 | 9/1989 | Dorner et al. | 414/788.2 |
| 4,909,412 | 3/1990 | Cerf | 221/1 |
| 4,915,578 | 4/1990 | Becker | 414/797.6 |
| 4,979,870 | 12/1990 | Mojden et al. | 414/788.4 |
| 4,988,263 | 1/1991 | Odenthal | 414/795.8 |
| 4,997,339 | 3/1991 | Antonis | 414/791.2 |
| 5,069,597 | 12/1991 | Doctor | 414/788.7 |
| 5,112,181 | 5/1992 | Rasmussen | 414/416 |
| 5,169,283 | 12/1992 | Covert | 414/793.7 |
| 5,348,441 | 9/1994 | Takemasa et al. | 414/796.7 |
| 5,391,051 | 2/1995 | Sabatier et al. | 414/797.2 |
| 5,545,001 | 8/1996 | Capdeboscq | 414/790.8 |
| 5,556,252 | 9/1996 | Kuster | 414/796.7 |
| 5,700,128 | 12/1997 | Tönnigs et al. | 414/797 X |

*Primary Examiner*—Janice L. Krizek
*Attorney, Agent, or Firm*—Sperry, Zoda & Kane

[57] ABSTRACT

An apparatus for providing an automated device for removing horizontal members such as lid members from a vertical stack thereof one at a time for processing such as refurbishing, cleaning or sanitizing thereof. A carriage assembly is movably guided by a carriage guide plate between a pick-up position adjacent a lid stack for movement thereof one at a time to a releasing position for refurbishing. The carriage assembly includes a carriage frame defining a vacuum chamber therein connected through fluid flow communication to a source of vacuum and a source of high pressure blowback air. Pick-up outlets are defined in the carriage frame and include vacuum cups thereon to facilitate applying suction adjacent to a single lid for lifting thereof by the carriage assembly and movement from the pick-up position to the releasing position. A stack securement device is also provided for clamping the remaining portion of the stack as a single lid is removed from the top of the stack by vacuum.

20 Claims, 4 Drawing Sheets

APPARATUS FOR AUTOMATICALLY UNSTACKING HORIZONTAL LID MEMBERS FROM A VERTICALLY EXTENDING STACK THEREOF

BACKGROUND OF THE INVENTION

1. Field of the Invention

The present invention deals with the field of devices for unstacking of a stack of generally flat members such as lids. Such lids are commonly used in association with totes or trays in the poultry slaughter business for holding and transporting slaughtered poultry for processing thereof. Such use obviously necessitates repetitive cleaning and the unstacking apparatus of the present invention provides an automatic means for feeding stacks of dirty lids to a washing apparatus for cleaning thereof periodically as necessary. Such a cleaning apparatus often requires these lids to be oriented vertically as they are washed, rinsed, sanitized and dried and, as such, the present invention also applies to those devices wherein an output guide is included for orienting the horizontal lid members vertically when exiting through the output station of this apparatus.

2. Description of the Prior Art

Numerous prior art devices have been designed for automatically stacking and unstacking horizontal members with respect to a stack thereof such as shown in U.S. Pat. No. 3,912,070 patented Oct. 14, 1975 to Vern V. Cronk et al and assigned to Baker Perkins, Inc. on a "Tray Handling Apparatus"; and U.S. Pat. No. 4,221,519 patented Sep. 9, 1980 to K. Nord et al and assigned to Ex-Cell-O Corporation on a "Conveying And Stacking Machine"; and U.S. Pat. No. 4,355,939 patented Oct. 26, 1982 to H. J. Musgrave on a "Palletized Poultry Coop Handling System"; and U.S. Pat. No. 4,403,900 patented Sep. 13, 1983 to P. M. Thomas and assigned to Builders Equipment Company on a "Pallet Storing And Distributing Apparatus"; and U.S. Pat. No. 4,588,341 patented May 13, 1986 to K. Motoda and assigned to Motoda Denshi Kogyo Kabushiki Kaisha on an "Article Delivery Apparatus"; and U.S. Pat. No. 4,592,692 patented Jun. 3, 1986 to D. Suizu et al and assigned to Okura Yusoki Kabushiki Kaisha on a "Pallet Loading Apparatus"; and U.S. Pat. No. 4,642,013 patented Feb. 10, 1987 to F. Mundus et al and assigned to Windmoller & Holscher on an "Apparatus For Stacking Flat Articles"; and U.S. Pat. No. 4,648,771 patented Mar. 10, 1987 to I. Yoshioka on a "Robot Hand For Stacking Boxes"; and U.S. Pat. No. 4,710,089 patented Dec. 1, 1987 to T. Schneider and assigned to Velten & Pulver, Inc. on an "Article Unstacking System"; and U.S. Pat. No. 4,768,913 patented Sep. 6, 1988 to K. Baba and assigned to Kabushiki Kaisha Komatsu on a "Destacker"; and U.S. Pat. No. 4,820,103 patented Apr. 11, 1989 to W. C. Dorner et al and assigned to Dorner Mfg. Corp. on an "Apparatus For Vertically Stacking And Storing Articles"; and U.S. Pat. No. 4,824,308 patented Apr. 25, 1989 to F. Carboniero et al and assigned to Omera Spa on a "Separating And Lifting Device For Stacked-Up Flat Elements"; and U.S. Pat. No. 4,865,515 patented Sep. 12, 1989 to W. Dorner et al and assigned to Dorner Mfg. Corp. on an "Apparatus For Unstacking And Stacking Containers"; and U.S. Pat. No. 4,909,412 patented Mar. 20, 1990 to A. Cerf and assigned to Polycerf Inc. on "Machines And Methods For Separating Nested Trays"; and U.S. Pat. No. 4,915,578 patented Apr. 10, 1990 to H. Becker and assigned to Total Tote, Inc. on a "Bin Unstacking Machine"; and U.S. Pat. No. 4,979,870 patented Dec. 25, 1990 to W. Mojden et al and assigned to Fleetwood Systems, Inc. on an "Automatic Tray Loading, Unloading and Storage System"; and U.S. Pat. No. 4,988,263 patented Jan. 29, 1991 to H. Odenthal and assigned to Ostma Maschinebau GmbH on an "Apparatus For The Destacking Of Pallets"; and U.S. Pat. No. 4,997,339 patented Mar. 5, 1991 to M. Antonis and assigned to FPS Food Processing Systems, B.V. on a "Device For Stacking Trays With Articles"; and U.S. Pat. No. 5,069,597 patented Dec. 3, 1991 to L. Doctor on an "Automatically Loading And Unloading Mechanism For Flat Removable Storage Elements"; and U.S. Pat. No. 5,112,181 patented May 12, 1992 to H. Rasmussen and assigned to Sanovo Engineering A/S on a "Feeding Apparatus For Transferring Eggs"; and U.S. Pat. No. 5,169,283 patented Dec. 8, 1992 to W. Covert on a "Basket Denester"; and U.S. Pat. No. 5,348,441 patented Sep. 20, 1994 to K. Takemasa et al and assigned to Sony Corporation on a "Parts Tray Conveying System"; and U.S. Pat. No. 5,391,051 patented Feb. 21, 1995 to L. Sabatier et al and assigned to Compagnie Generale d'Automatisme CGA-HBS on an "Unstacker For Unstacking Flat Items, The Unstacker Including Realignment Apparatus"; and U.S. Pat. No. 5,545,001 patented Aug. 13, 1996 to B. Capdeboscq and assigned to SA Martin on a "Station For Piling, Separating And Ejecting Batches Of Plate-Like Workpieces At An Outlet Of A Processing Machine"; and U.S. Pat. No. 5,556,252 patented Sep. 17, 1996 to R. Kuster and assigned to MAN Roland Druckmaschinen AG on a "Stack Lifting Apparatus And Method".

SUMMARY OF THE INVENTION

The present invention provides an apparatus for automatically unstacking horizontal lid members from a vertically extending stack. The device includes preferably a main frame which includes an input station and an output station. The input station is adapted to receive stacks of lid members for separation and movement thereof one at a time to the output station.

A carriage guide plate is preferably included fixedly secured to the main frame and mounted extending vertically therein. Preferably two such guide plates are included on opposite sides of the input station. Each carriage guide plate preferably defines an upper slot and a lower slot extending therealong between a position adjacent the input station and a position adjacent the output station. The upper slot and the lower slot preferably extend parallel with respect to one another and each includes a horizontal slot segment and an oblique slot segment connected to one another. The oblique slot segment is oriented to connect to the upper horizontal slot segment and extend downwardly and outwardly therefrom adjacent the input station. In this manner guiding of movement of a carriage assembly is facilitated.

The present invention further includes a carriage assembly movably mounted within a carriage guide plate such as to be capable of movement between a pick-up position adjacent the input station and a releasing position adjacent the output station. The carriage assembly is movable therebetween to facilitate movement of lids detachably secured thereto.

The carriage assembly further preferably includes a carriage frame which defines a vacuum chamber therewithin. This carriage frame is preferably formed of a tubular construction having a square or rectangular cross section to facilitate strength characteristics thereof. The carriage frame further defines a vacuum opening therein in fluid flow communication with respect to the vacuum chamber for applying a vacuum thereto. The carriage frame further defines a blowback opening therein in fluid flow communication with respect to the vacuum chamber for selectively supplying air thereto. The carriage frame further defines a pick-up outlet in fluid flow communication with said vacuum chamber to facilitate pick up of horizontal lid members therebelow within the input station and release of horizontal lid members within the output station therebelow.

A plurality of guide members are also included within the configuration of the carriage assembly which preferably are secured to the carriage frame and extending generally laterally outward therefrom into the upper slot and the lower slots defined in the carriage guide plates on each opposite side thereof for facilitating engagement therewith. In this manner the carriage assembly is guided by the engagement between the guide members and the slots defined therein to facilitate guiding of movement thereof between the pick-up position adjacent the input station and the releasing position adjacent the output station.

A vacuum cup device is preferably secured with respect to each of the pick-up outlets defined in the frame to facilitate gripping a horizontal lid member therebelow responsive to abutment therewith and the application to a vacuum opening. These vacuum cups are preferably formed of a flexibly resilient material to facilitate abutment and gripping with a horizontal lid member positioned therebelow.

The carriage assembly may also preferably include a carriage bracket extending upwardly therefrom with at least one of the guide members secured therein and extending outwardly therefrom to facilitate guiding of selective movement of the carriage assembly between the pick-up position and the releasing position. Each of the guide members which are secured to the carriage bracket means are preferably positioned to extend into the upper slot. All other of the guide members are positioned to extend into the lower slots to facilitate guiding of movement of the carriage assembly between the pick-up position and the releasing position.

The apparatus of the present invention further includes a main drive operatively secured to the carriage assembly to selectively urge movement thereof between the pick-up position adjacent the input station and the releasing position adjacent the output station. Preferably the main drive means actually comprises a main hydraulic piston operative to selectively facilitate movement of the carriage assembly between the input station and the output station responsive to axially extended movement thereof.

A lifting platform may also be included within the present invention mounted within the input station of the main frame and be vertically movable therewithin between a lower platform position and an upper platform position. In the lower platform position the lifting platform is adapted to receive stacks of horizontal lid members. In the upper platform position the lifting platform is positioned adjacent the carriage assembly in order to facilitate the removal of lid members singly from a stack located there.

A stack securement apparatus is also included in the present invention which is mounted to the frame means and is positioned adjacent the input station. This stack securement device is preferably operative to selectively retain a stack of horizontal lid members below the uppermost lid thereon downwardly with respect to the lifting platform means thereunder. The stack securement apparatus preferably includes a clamping driveshaft rotatably mounted to the frame as well as one or more clamping arms fixedly secured to the clamping driveshaft in order to be pivotally movable therewith and with respect to the main frame. Each of the clamping arms are preferably movable to a clamping position within the input station in abutment with all lid members within the stack other than the uppermost lid member to facilitate holding thereof as the uppermost lid member is removed by the carriage assembly. Each of the clamping arms is also preferably movable to a retracted position spatially disposed from any horizontal lid member positioned upon the lifting platform within the input station to allow movement thereof and to allow vertical movement of the lifting platform.

A plurality of rubber gripping members may also be fixedly secured to the clamping arm such as to be adapted to be moved into abutment with the stack of horizontal lid members for facilitating gripping thereof by the clamping arm responsive to movement thereof to the clamping position within the input station.

A clamping arm drive may also be included within the configuration of the stack securement apparatus and be operatively secured to the clamping driveshaft for urging rotational movement thereof to cause movement of the clamping arm selectively to the clamping position with the clamping arm in abutment with a stack of horizontal lid members for holding thereof. The clamping arm drive is also preferably operatively secured to the clamping driveshaft for urging rotational movement thereof to cause movement of the clamping arm selectively to the retracted position with the clamping arm withdrawn from the input station and remotely positioned with respect to any lid member positioned therewithin. The clamping arm drive preferably comprises a clamping hydraulic piston which is axially extendable and retractable to selectively urge movement of the clamping arm means between the clamping position and the retracted position as desired.

A vacuum line or conduit may also be attached to the vacuum opening means to be in fluid flow communication therewith and be adapted to selectively provide a vacuum thereto responsive to the vacuum cup moving to the pick-up position within the input station and into abutment with the horizontal lid member therein. The vacuum line is preferably operable to cease the applying of a vacuum to the vacuum opening responsive to movement of the carriage assembly to the releasing position within the input station to facilitate detachable release of a horizontal lid retained.

A blowback line or conduit may also be attached to the blowback opening to be in fluid flow communication therewith and be adapted to selectively provide pressurized air thereto responsive to movement of the carriage assembly means to the releasing position within the output station to facilitate release of a horizontal lid member.

In certain configurations the present invention makes use alternatively of an output guide positioned adjacent the output station of the apparatus to guide movement of horizontal lid members released therewithin. Preferably the configuration of this output guide is such that it defines a V-shaped receiving slot for receiving of horizontal lid members released thereabove from the carriage assembly when positioned within the releasing position.

The output guide preferably includes a primary inclined guide wall including an upper edge defined thereon positioned at the output station below the carriage assembly for causing tilting of a horizontal lid member released thereabove. The upper edge is positioned below the releasing position in order to facilitate abutment with a horizontal lid member released thereabove to urge movement thereof into the V-shaped receiving slot with the lid oriented somewhat vertically. The primary inclined guide wall and the upper edge also are oriented perpendicularly with respect to the direction of movement of the carriage assembly moving between the pick-up station and the releasing position in order to facilitate exiting of a horizontal lid member from the output station perpendicularly with respect thereto.

In a similar manner a secondary inclined guide wall may be spatially disposed from the primary inclined guide wall to form the V-shaped receiving slot therebetween. This secondary inclined guide wall may also be oriented perpendicularly with respect to the direction of movement of the carriage assembly moving between the pick-up station and the releasing position in order to facilitate exiting of a horizontal lid member from the output station perpendicular with respect thereto.

It is an object of the present invention to provide an apparatus for automatically unstacking horizontal lid members from vertically extending stacks thereof wherein use with lids for totes or trays designed to hold slaughtered poultry is facilitated.

It is an object of the present invention to provide an apparatus for automatically unstacking horizontal lid members from vertically extending stacks thereof wherein use with any horizontally extending lid which can be formed into stacks thereof is made possible.

It is an object of the present invention to provide an apparatus for automatically unstacking horizontal lid members from vertically extending stacks thereof wherein initial capital costs for equipment is minimized.

It is an object of the present invention to provide an apparatus for automatically unstacking horizontal lid members from vertically extending stacks thereof wherein labor costs are minimized.

It is an object of the present invention to provide an apparatus for automatically unstacking horizontal lid members from vertically extending stacks thereof wherein down time is minimized.

It is an object of the present invention to provide an apparatus for automatically unstacking horizontal lid members from vertically extending stacks thereof wherein maintenance costs are minimized.

It is an object of the present invention to provide an apparatus for automatically unstacking horizontal lid members from vertically extending stacks thereof wherein a minimum of vacuum is expended.

It is an object of the present invention to provide an apparatus for automatically unstacking horizontal lid members from vertically extending stacks thereof wherein all controls are hydraulic other than the pneumatic vacuum pick up.

It is an object of the present invention to provide an apparatus for automatically unstacking horizontal lid members from vertically extending stacks thereof wherein the vacuum conduit line for providing suction to cups positioned in abutment with the uppermost lid is provided through the fixed framework of the movable carriage.

It is an object of the present invention to provide an apparatus for automatically unstacking horizontal lid members from vertically extending stacks thereof wherein a lifting means is provided for repositioning a lid member at a location within the input station to facilitate removal thereof by the carriage assembly.

It is an object of the present invention to provide an apparatus for automatically unstacking horizontal lid members from vertically extending stacks thereof wherein horizontally extending lids exiting from the output station can be oriented vertically by an output guide which includes a V-shaped receiving slot.

It is an object of the present invention to provide an apparatus for automatically unstacking horizontal lid members from vertically extending stacks thereof wherein accuracy in the guiding of movement of the carriage assembly between the input station and the output station is enhanced by the use of specific slot configurations within which guide members of the carriage are positioned to carefully and accurately control the path of movement of the carriage assembly at all times.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
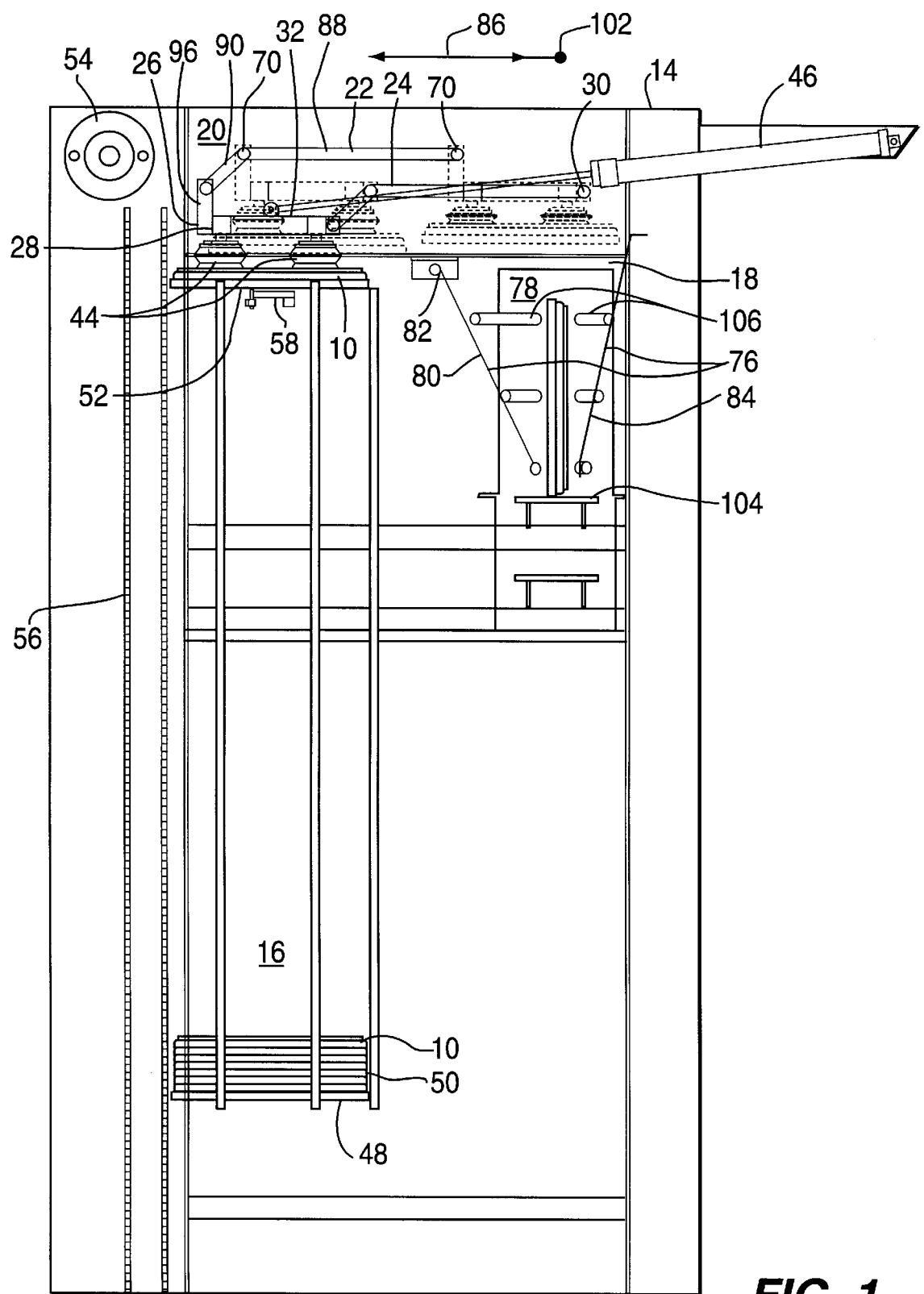
FIG. 1 is a side plan view of an embodiment of the apparatus for automatically unstacking horizontal lid members from a vertically extending stack thereof of the present invention.

The apparatus of the present invention provides a means for unloading stacks 12 or horizontal lid members 10. Such horizontal lid members are often used in association with trays or totes for closing the top thereof during certain manners of usage. One primary area of usage of such horizontal lid members 10 is in closing the upper surface of a tray or tote used for holding slaughtered poultry for transporting thereof for further processing. After usage it is preferable to provide a means for cleaning of the lids and it is preferable that the lids be oriented singly and traveling upon a conveyor to facilitate cleaning of all various orifices and corners thereof. For this reason the present invention provides a means for automatically separating stacks 12 of lid members 10 such that they can be fed one at a time through a processing station for refurbishing, cleaning or other processing.

The apparatus of the present invention includes a main frame 14 defining an input station 16 and an output station 18. Input station 16 is designed to receive stacks of lids 10 placed therein by a conveyor means or manually. A carriage assembly 26 is movably mounted with respect to the main frame 14. Control of movement of the carriage is achieved by the inclusion of preferably two carriage guide plates 20 positioned on each opposite side of the carriage assembly 26. The carriage guide plates 20 define upper slots 22 and lower slots 24 therein. The carriage assembly includes a carriage frame 32 as well as guide members 42 extending laterally outwardly therefrom. These guide members 42 are adapted to extend into the upper and lower slots 22 and 24 of the carriage guide plate 20 to control the path of movement of the carriage assembly 26 such that it can accurately and repeatedly move between a position adjacent the input station 16 and a position adjacent the output station 18 as desired. The carriage assembly 26 when positioned within the input station 16 is designed to be in the pick-up position 28. On the other hand the carriage assembly 26 when positioned within the output station 18 is designed to be in the releasing position 30. In the pick-up position 28 the carriage is designed to pick up a lid 10 from the uppermost end of a stack 12 thereof and to retain this lid detachably secured thereto until the carriage reaches the releasing position 30 at which time the lid is released into the output station 18.

The carriage frame 32 preferably is formed of a hollow tubular construction defining a vacuum chamber 34 therewithin. Preferably the carriage frame 32 is of a rectangular or square cross section to facilitate defining a vacuum chamber 34 therein while at the same time providing an overall structurally strong carriage frame 32.

Carriage frame 32 preferably also defines a vacuum opening 36 and a blowback opening 38 therewithin for selectively supplying of a vacuum through opening 36 or a high pressure blowback air through opening 38 to the vacuum chamber 34 as desired. The carriage frame 32 also defines at least one pick-up outlet 40 and as shown in FIG. 1 this embodiment defines exactly two such pick-up outlets.

A vacuum cup 44 is preferably positioned over each vacuum opening 36 to facilitate the fluid flow communication of a vacuum or of high pressure air from the vacuum chamber 34 outwardly therethrough. Preferably these vacuum cups 44 are of a flexibly resilient material such as rubber to facilitate abutting engagement with respect to the upper surface of a horizontal lid member 10 within the input station 16 when the carriage assembly 26 is moved to the pick-up position 28.

Movement of the carriage assembly 26 between the pick-up position 28 and the releasing position 30 in a back and forth manner is achieved by operation of a main drive 46. As shown best in FIG. 1, main drive 46 will preferably comprise a piston means and is preferably a hydraulic piston means which is axially extensible and is secured to the carriage frame 32 to facilitate powering of movement of the carriage assembly 26. This path of movement will allow repeated cycles of movement of the carriage assembly 26 between the pick-up position 28 within the input station 16 and the releasing position 30 within the output station 18.

A lifting platform 48 is preferably positioned adjacent the input station 16 and is designed to move the stacks 12 of horizontal lid members 10 vertically upwardly as desired. The lifting platform 48 is designed to be powered by a lifting platform drive 54 connected thereto to a lifting platform chain 56. Operation of the lifting platform drive 54 will allow the lifting platform 48 to move between the lower platform position 50 and the upper platform position 52 as desired. While in the lower platform position 50 the lifting platform 48 is adapted to receive stacks 12 of horizontal lid members 10 placed therein. The lifting platform drive 54 can then be operated to cause the lifting platform 48 to lift this stack of lids 10 upwardly until they reach the upper platform position 52. In this upper platform position 52 the uppermost lid 10 is in position to be brought into abutment with the vacuum cups 44 of the carriage assembly 26 when it is moved completely to the pick-up position 28 within input station 16. At this point vacuum is applied through the vacuum opening 36 thereto and the uppermost lid 10 is now detachably secured to the carriage assembly through the vacuum cups 44 as needed.

Figure 2:
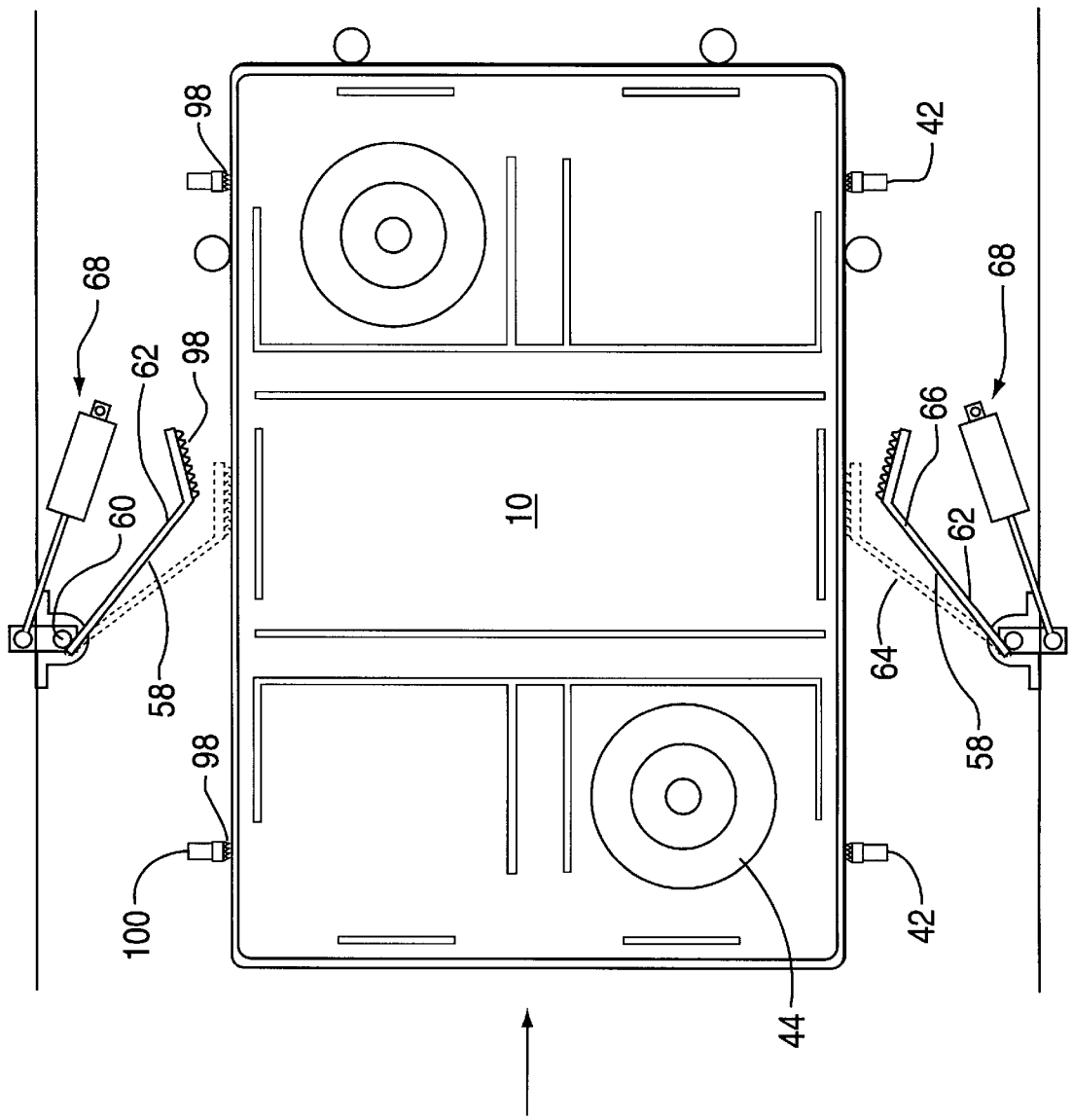
FIG. 2 is a top plan view of an embodiment of the input station of the apparatus of the present invention showing movement of the stack securement device between the clamping position and the retracted position.
Figure 3:
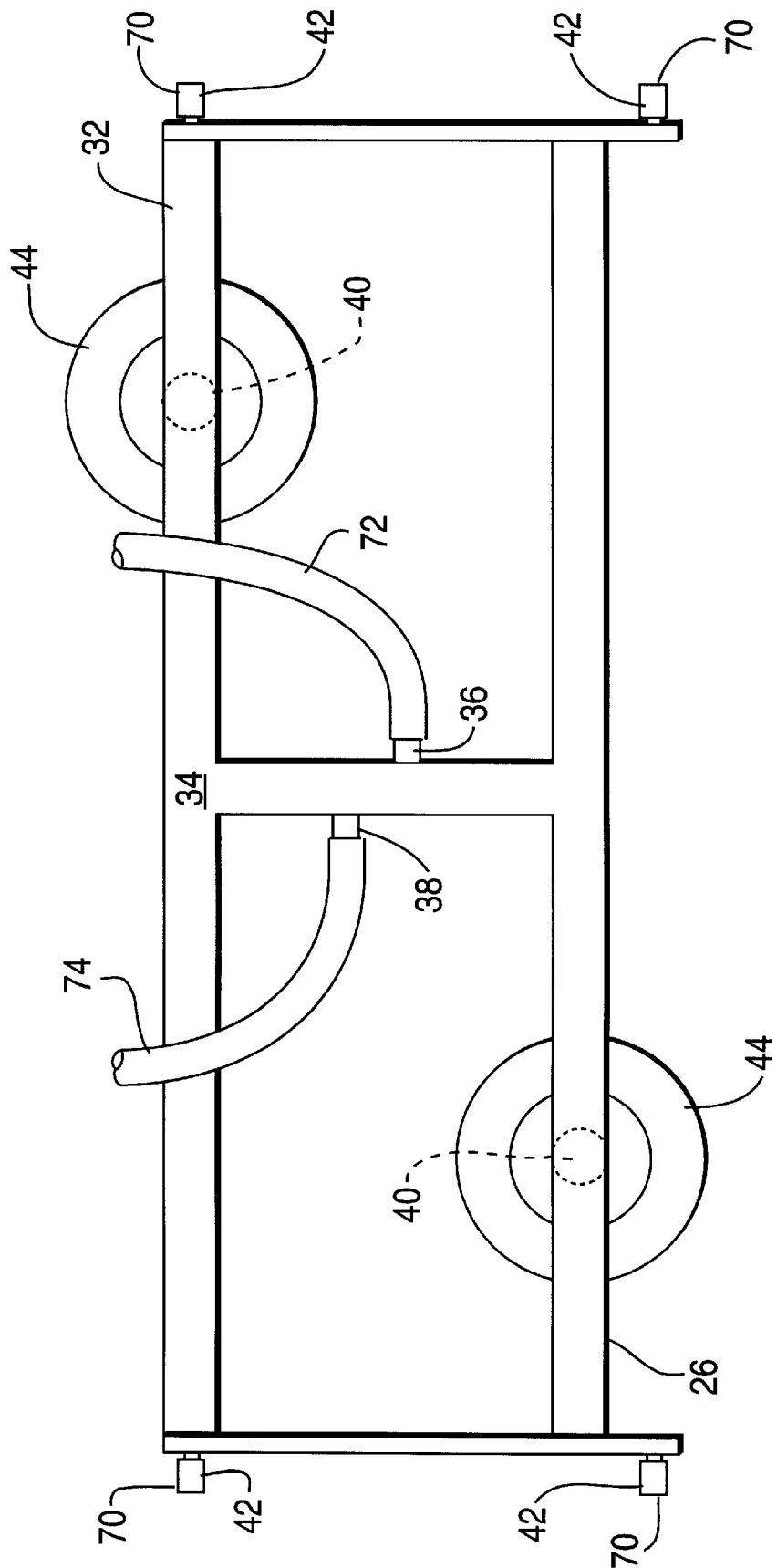
FIG. 3 is a top cross-sectional view of an embodiment of the carriage assembly of the present invention.

In order to assure full and complete separation between the uppermost lid and the second lid within the stack 12 thereof, a stack securement device 58 is included in the apparatus of the present invention. This stack securement device preferably includes a clamping driveshaft 60 which is preferably oriented vertically and is rotatably mounted with respect to the main frame 14. Clamping driveshaft 60 includes a clamping arm 62 fixedly secured thereto. Clamping arm 62 is movable between a clamping position 64 in engagement with respect to the stack 12 of lids 10 and, in particular, with respect to the second, third and perhaps fourth lid within a given stack and is positioned to be not in contact with the uppermost lid to allow it to be removed from the stack. In this clamping position 64 the clamping arm 62 will retain all lids 10 within a stack thereof other than the uppermost lid which is not abutted and can be easily removed. The clamping arm means 62 may comprise two separate clamping arm members as shown in FIG. 2 movable laterally in abutment with each opposite side of the stack 12. The clamping arms 62 are also preferably movable to a retracted position 66 as shown in FIG. 2 wherein contact with the stack 12 does not exist and in this manner vertical movement of the stack 12 is possible for repositioning thereof to ready the stack 12 for removal of the next uppermost lid 10 thereof.

A clamping arm drive 68 preferably in the form of a hydraulic piston is preferably operatively secured with respect to the clamping driveshaft 60 to cause rotational movement thereof to provide full control of movement of the clamping arm 62 between the clamping position 64 and the retracted position 66.

A plurality of guide rollers 70 are also preferably included in the apparatus of the present invention as a part of the guide members 42. Preferably these guide rollers 70 are made to facilitate rolling contact between the guide members 42 and the upper and lower slots 22 and 24 to facilitate movement therewithin while at the same time to maintain the guide members 42 themselves positioned within the slots to control the movement which is facilitated by the rollers themselves.

The present invention preferably includes a vacuum line 72 which is connected in this preferred embodiment to a source of vacuum. This vacuum line 72 is preferably connected to the vacuum opening 36 such as to be in fluid flow communication with the vacuum chamber 34 for supplying a vacuum thereto to facilitate gripping of a lid by the flexibly resilient vacuum cups 44. Also a blowback line 74 is connected to the blowback opening 38 and in full fluid flow communication with the vacuum chamber 34. The blowback line 74 is adapted to provide air under high pressure to the vacuum chamber 34 selectively in order to provide an outward burst of air through the vacuum cup 44 whenever the carriage assembly 26 reaches the releasing position 30. This burst of blowback air expelled through line 74 will enhance breaking of the suction between the vacuum cup 44 and the upper surface of the lid member 10 for releasing of the lid 10 at the releasing position 30 within the output station 18.

Whenever a lid 10 is released within the output station 18 movement thereof should be controlled to facilitate whatever processing step is to be performed on that lid. If washing is the step more often it is required or at least preferred that the lid be oriented on its edge in a vertically extending direction to facilitate full cleaning of all corners and surfaces. This is best achieved by the inclusion of an output guide 76 adjacent the output station 18 of the apparatus of the present invention. This output guide 76 preferably defines a V-shaped receiving slot 78 defined by a primary inclined wall 80 positioned below the releasing position 30 and a secondary inclined guide wall 84 spatially disposed from the primary inclined wall 80 in order to define the V-shaped receiving slot 78 therebetween. The primary inclined guide wall 80 preferably defines an upper edge 82 therealong positioned below the releasing position 30. As such, when a lid 10 is released from the carriage assembly 26 it will fall downwardly and immediately come in contact with the upper edge 82 which will rotate the lid slightly such that it will assume a vertical orientation within the V-shaped receiving slot 78 between the primary inclined guide wall 80 and the secondary inclined guide wall 84. In the configuration shown in FIG. 1 the path of movement of the lid 10 within the V-shaped receiving slot 78 will be perpendicular to the path of movement of the carriage assembly 26. Path of movement of the carriage assembly 26 is generally shown in FIG. 1 by reference numeral 86 and the orientation of the V-shaped slot 78 is shown by reference numeral 102 which will be vertical with respect to FIG. 1 shown by dot 102.

Figure 4:
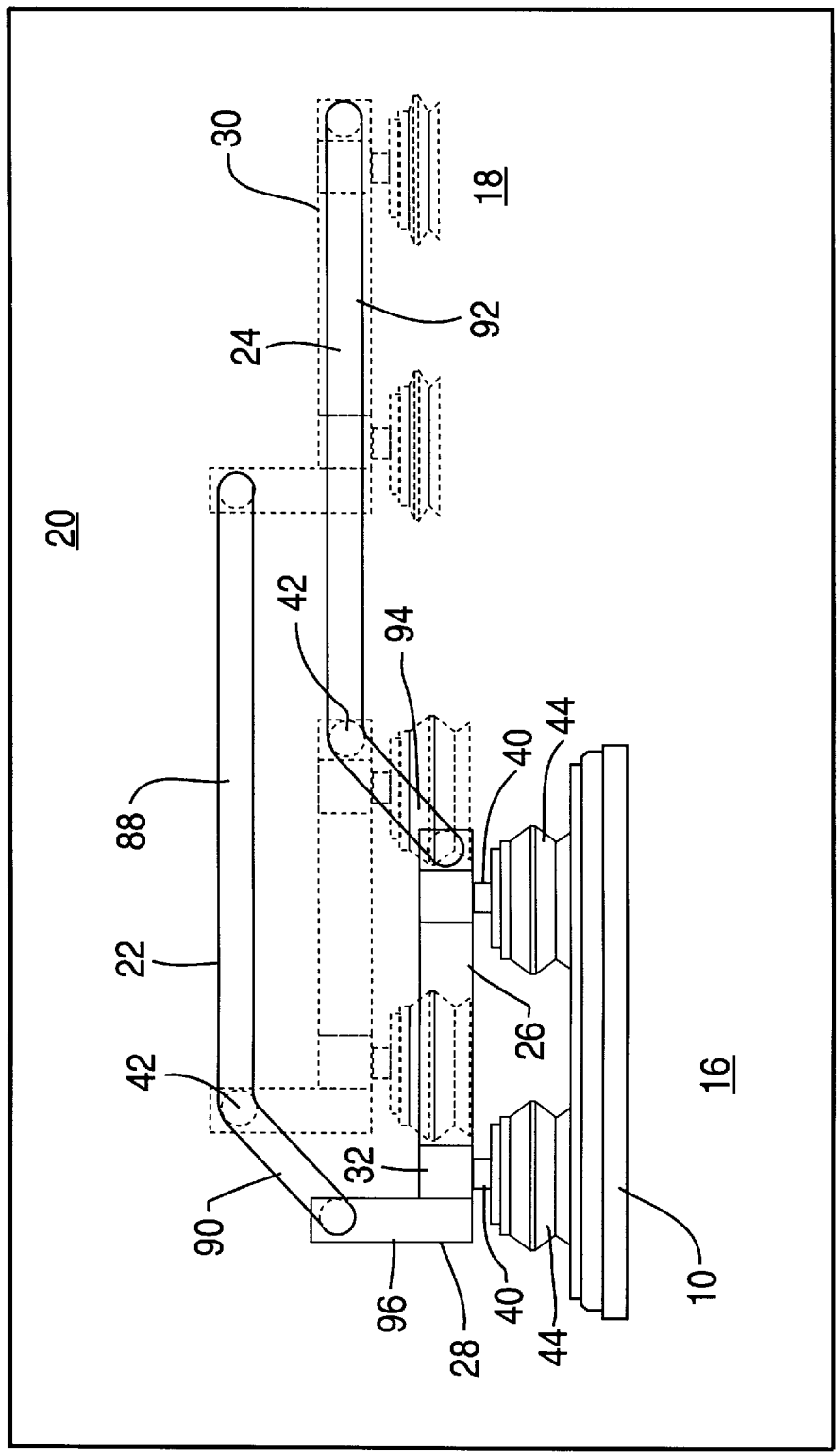
FIG. 4 is a side plan view of an embodiment of the present invention showing the apparatus for automatically unstacking lid members of the present invention showing the carriage assembly and its entire path of movement as guided by the upper and lower slots defined in the carriage guide plate positioned thereadjacent.

In the preferred configuration of the present invention a carriage guide plate 20 will be positioned on each opposite side of the path of movement of the carriage assembly 26 to facilitate guiding thereof. Each carriage guide plate 20 will preferably have the same configuration. In these configurations the upper slot 22 will preferably include an upper horizontal slot segment 88 and an upper oblique slot segment 90 extending downwardly and outwardly from the end of upper horizontal slot segment 88 closest to the input station 16. In a similar manner the lower horizontal slot segment 92 will be connected to a lower oblique slot segment 94. Lower oblique slot segment 94 will preferably be connected to the end of segment 92 closest to the input station 16. In this manner with the guide members 42 of the carriage assembly 26 extending into both the upper and lower slot segments 88, 90, 92 and 94, full guiding of accurate movement of the carriage assembly 26 between the pick-up position 28 and the releasing position 30 is achieved. To facilitate the positioning of guide members 42 within the upper horizontal slot segment 88 and the upper oblique slot segment 90, a carriage bracket 96 may be secured to the carriage frame 32 fixedly. With this configuration one of the guide members 42 can be movably secured to the carriage bracket 96 and that guide member can be positioned within the upper slot means 22 to further control operative movement as shown best in FIG. 4. FIG. 4 shows all slot segments 88, 90, 92 and 94 and the positioning of the carriage frame 32 with respect thereto when in the pick-up position 28, the releasing position 30 and at an intermediate position therebetween.

To facilitate the securement of the clamping arms 62 when in the clamping position 64 with respect to a stack 12 of lids 10, rubber gripping members 98 or pads may be fixedly secured to the clamping arm 62. The positioning of these rubber gripping members 98 are such that they will be brought into abutment with the stack 12 of lids 10 whenever the clamping arm 62 is moved to the clamping position 64.

Also, side alignment members 100 which also may include rubber gripping members 98 fixedly secured thereto, are shown in FIG. 2 to facilitate centralized positioning of a stack 12 of lid members positioned within the input station 16.

As lid members are transferred one at a time from the pick-up position 28 to the releasing position 30 they are dropped preferably into the V-shaped slot 78. At this point the lowermost end thereof will be positioned upon an exit conveyor 104. This exit conveyor 104 will preferably continue to move and will cause the individual lid 10 to exit the output station 18 and guide bars 106 can be optionally included to maintain vertical orientation or achieve vertical orientation of these lid members as they pass to the refurbishing station thereadjacent.

In operation, a stack 12 of lid members 10 will be positioned upon the lifting platform 48 when it is in the lower platform position 50. Then the lifting platform drive 54 will be actuated causing driving of the lifting platform 48 by the lifting platform chain 56 to the upper platform position 52. In this upper position the stack 12 of lids 10 will be now positioned such that the uppermost lid thereon can be removed by the apparatus of the present invention.

The main hydraulic piston drive 46 is then operated to extend causing movement of the carriage assembly 26 as guided within the upper and lower slots 22 and 24 to the pick-up position 28. Downward movement of the carriage frame 32 and the vacuum cups 44 secured thereto are controlled by the downwardly and outwardly extending upper and lower oblique slot segments 90 and 94. The downward inclination of these slots causes the vacuum cups 44 to be brought into abutment with the upper surface of the uppermost lid on a stack 12. At this time the vacuum line 72 is activated causing a vacuum to be conveyed through the vacuum chamber 34 to the vacuum cups 44 which are flexibly resilient and are adapted to detach the uppermost lid member from the stack 12 thereof by suction.

This detachment is achieved due to the fact that the remaining portion of the stack 12 of lids 10 is secured by the stack securement member 58 which has moved the clamping arm 62 thereof to the clamping position 64 by operation of the clamping hydraulic piston 68.

The main drive 46 is then operated to retract to cause movement of the carriage assembly 26 from the pick-up position 28 to the releasing position 30. Once the releasing position 30 has been reached the apparatus of the present invention is operative to cause a burst of air under pressure, often referred to as blowback air, to be expelled through the blowback line 74 into the vacuum chamber 34 and outwardly through the vacuum cups 44. This burst of blowback air will cause the lid 10 to be detached from securement with respect to the carriage assembly 26. Since the carriage assembly 26 at this point will be positioned within the output station 18 the lid member 10 will be released and fall downwardly into the V-shaped receiving slot 78. The exit conveyor 104 will then convey the removed lid as desired for refurbishing.

The main drive 46 will then extend causing movement of the carriage assembly 26 from the releasing position 30 back to the pick-up position 28. As this movement occurs the stack securement means 58 will release thereby allowing slight upward movement by the lifting platform 48 such that the next lid is in position within the input station 16 to be picked up by the vacuum cups 44 of the carriage assembly 26. This cycle is repeated for each horizontal lid member 10 within the stack 12 thereof.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An apparatus for automatically unstacking horizontal lid members from a vertically extending stack thereof comprising:

A. a main frame means defining an input station means and an output station means therein, said input station means being adapted to receive stacks of horizontal lid members for separation and movement thereof singly to said output station means;

B. a carriage guide plate means fixedly secured to said main frame means and mounted extending generally vertically therein, said carriage guide plate means defining an upper slot means and a lower slot means extending therealong between said input station means and said output station means;

C. a carriage assembly means movably mounted within said carriage guide plate means between a pick-up position adjacent said input station means and a releasing position adjacent said output station means and movable therebetween, said carriage assembly means comprising;

(1) a carriage frame means defining a vacuum chamber means therewithin, said carriage frame means further defining a vacuum opening means therein in fluid flow communication with respect to said vacuum chamber means for applying a vacuum thereto, said carriage frame means further defining a blowback opening means therein in fluid flow communication with respect to said vacuum chamber means for selectively supplying air thereinto, said carriage frame means further defining a pick-up outlet means in fluid flow communication with said vacuum chamber means to facilitate pick up of horizontal lid members therebelow within said input station means and release of horizontal lid members within said output station means therebelow;

(2) a plurality of guide members secured to said carriage frame means and extending generally laterally outwardly therefrom into said upper slot means and said lower slot means defined in said carriage guide plate means for engagement therewithin to facilitate guiding of movement of said carriage assembly means between said pick-up position adjacent said input station means and said releasing position adjacent said output station means;

(3) a vacuum cup means secured to said pick-up outlet means defined in said carriage frame means to facilitate gripping a horizontal lid member therebelow responsive to abutment therewith and application of a vacuum to said vacuum opening means;

D. a main drive means operatively secured to said carriage assembly means to urge selective movement thereof between said pick-up position adjacent said input station means and said releasing position adjacent said output station means;

E. a lifting platform means mounted within said input station means of said main frame means and being vertically movable therewithin between a lower platform position adapted to receive stacks of horizontal lid members and an upper platform position adjacent said carriage assembly means to facilitate removal of lid members singly from a stack thereof;

F. a stack securement means mounted to said frame means and positioned adjacent said input station means, said stack securement means being operative to selectively retain a stack of horizontal lid members below the uppermost lid thereon downwardly with respect to said lifting platform means therebelow, said stack securement means comprising;

(1) a clamping driveshaft means rotatably mounted with respect to said main frame means;

(2) a clamping arm means fixedly secured to said clamping driveshaft means in order to be pivotably movable therewith with respect to said main frame means, said clamping arm means being movable to a clamping position within said input station means in abutment with all lid members within a stack thereof below the top lid member positioned upon said lifting platform means, said clamping arm means also being movable to a retracted position spatially disposed from any horizontal lid members positioned upon said lifting platform means within said input station means to allow movement thereof and to allow vertical movement of said lifting platform means; and (3) a clamping arm drive means operatively secured to said clamping driveshaft means for urging rotational movement thereof to cause movement of said clamping arm means selectively to the clamping position with said clamping arm means in abutment with a stack of horizontal lid members for holding thereof, said clamping arm drive means also being operatively secured to said clamping driveshaft means for urging rotational movement thereof to cause movement of said clamping arm means selectively to the retracted position with said clamping arm means withdrawn from said input station means and remotely positioned with respect to any horizontal lid member positioned therewithin.

2. An apparatus for automatically unstacking horizontal lid members from a vertically extending stack thereof as defined in claim 1 wherein said upper slot means and said lower slot means extend parallel with respect to one another within said carriage guide plate means.

3. An apparatus for automatically unstacking horizontal lid members from a vertically extending stack thereof as defined in claim 1 wherein said guide members comprise guide rollers positioned with in said upper slot means and said lower slot means for facilitating rolling therealong for guiding of movement of said carriage assembly means between said input station means and said output station means.

4. An apparatus for automatically unstacking horizontal lid members from a vertically extending stack thereof as defined in claim 3 wherein said guide rollers comprise metal guide rollers.

5. An apparatus for automatically unstacking horizontal lid members from a vertically extending stack thereof as defined in claim 1 wherein said vacuum cup means is formed of a flexibly resilient material to facilitate abutment and gripping with a horizontal lid member positioned therebelow.

6. An apparatus for automatically unstacking horizontal lid members from a vertically extending stack thereof as defined in claim 1 further comprising a vacuum line means attached to said vacuum opening means to be in fluid flow communication therewith and adapted to selectively provide a vacuum thereto responsive to said vacuum cup means moving to said pick-up position within said input station means and into abutment with a horizontal lid member therein, said vacuum line means being operable to cease applying of a vacuum to said vacuum opening means responsive to movement of said carriage assembly means to said releasing position within said output station means to facilitate release of a horizontal lid.

7. An apparatus for automatically unstacking horizontal lid members from a vertically extending stack thereof as defined in claim 1 further comprising a blowback line means attached to said blowback opening means to be in fluid flow communication therewith and adapted to selectively provide pressurized air thereto responsive to movement of said carriage assembly means to said releasing position within said output station means to facilitate release of a horizontal lid member.

8. An apparatus for automatically unstacking horizontal lid members from a vertically extending stack thereof as defined in claim 1 further comprising an output guide means positioned within said output station means to guide movement of horizontal lid members released therewithin.

9. An apparatus for automatically unstacking horizontal lid members from a vertically extending stack thereof as defined in claim 8 wherein said output guide means defines a V-shaped receiving slot means for receiving horizontal lid members released thereabove from said carriage assembly means when positioned in said releasing position, said output guide means comprising:
   A. a primary inclined guide wall means including an upper edge means thereof positioned adjacent said output station means below said carriage assembly means for causing tilting of a horizontal lid member released therefrom within said output station means, said upper edge means positioned below said releasing position to facilitate receiving of a horizontal lid member after release thereabove into said V-shaped receiving slot means; and
   B. a secondary inclined guide wall means spatially disposed from said primary inclined guide wall means to form said V-shaped receiving slot means therebetween.

10. An apparatus for automatically unstacking horizontal lid members from a vertically extending stack thereof as defined in claim 9 wherein said primary inclined guide wall means, said secondary inclined guide wall means and said upper edge means are oriented perpendicularly with respect to the direction of movement of said carriage assembly means moving between said pick-up position and said releasing position in order to facilitate exiting of a horizontal lid member from said output station means perpendicularly with respect thereto.

11. An apparatus for automatically unstacking horizontal lid members from a vertically extending stack thereof as defined in claim 1 wherein said main drive means comprises a main hydraulic piston means operative to selectively urge movement of said carriage assembly means between said input station means and said output station means.

12. An apparatus for automatically unstacking horizontal lid members from a vertically extending stack thereof as defined in claim 1 wherein said clamping arm drive means comprises a clamping hydraulic piston means operative to selectively urge movement of said clamping arm means between said clamping position and said retracted position.

13. An apparatus for automatically unstacking horizontal lid members from a vertically extending stack thereof as defined in claim 1 wherein each of said upper slot means includes:
   A. an upper horizontal slot segment; and
   B. a upper oblique slot segment connected to said upper horizontal slot segment and extending downwardly and outwardly therefrom adjacent said input station means to allow downward movement of said guide members therein and downward movement of said carriage assembly means to said pick-up position to facilitate abutment of said vacuum cup means with respect to the top horizontal lid member of a stack thereof positioned on said lifting platform means to facilitate gripping and removal therefrom and movement to said releasing position.

14. An apparatus for automatically unstacking horizontal lid members from a vertically extending stack thereof as defined in claim 1 wherein each of said lower slot means includes:
   A. an lower horizontal slot segment; and
   B. a lower oblique slot segment connected to said lower horizontal slot segment and extending downwardly and outwardly therefrom adjacent said input station means to allow downward movement of said guide members therein and downward movement of said carriage assembly means to said pick-up position to facilitate abutment of said vacuum cup means with respect to the top horizontal lid member of a stack thereof positioned on said lifting platform means to facilitate gripping and removal therefrom and movement to said releasing position.

15. An apparatus for automatically unstacking horizontal lid members from a vertically extending stack thereof as defined in claim 1 wherein said upper slot means and said lower slot means have the same configuration to facilitate guiding of movement of said carriage assembly means between said input station means and said output station means selectively.

16. An apparatus for automatically unstacking horizontal lid members from a vertically extending stack thereof as defined in claim 1 wherein said carriage assembly means includes a carriage bracket means extending upwardly therefrom with at least one of said guide members secured thereto and extending outwardly therefrom to facilitate guiding of movement of said carriage assembly means between said pick-up position and said releasing position.

17. An apparatus for automatically unstacking horizontal lid members from a vertically extending stack thereof as defined in claim 16 wherein each of said guide members secured to said carriage bracket means are positioned to extend into said upper slot means and all other of said guide members are positioned to extend into said lower slot means to facilitate guiding of movement of said carriage assembly means between said pick-up position and said releasing position.

18. An apparatus for automatically unstacking horizontal lid members from a vertically extending stack thereof as defined in claim 1 wherein said stack securement means includes rubber gripping members fixedly secured to said clamping arm means and adapted to be moved into abutment with a stack of horizontal lid members for facilitating gripping thereof by said clamping arm means responsive to movement thereof into said clamping position within said input station means.

19. An apparatus for automatically unstacking horizontal lid members from a vertically extending stack thereof comprising:
   A. a main frame means defining an input station means and an output station means therein, said input station means being adapted to receive stacks of horizontal lid members for separation and movement thereof singly to said output station means;
   B. a carriage guide plate means fixedly secured to said main frame means and mounted extending generally vertically therein, said carriage guide plate means defining an upper slot means and a lower slot means extending therealong between said input station means and said output station means;
   C. a carriage assembly means movably mounted within said carriage guide plate means between a pick-up position adjacent said input station means and a releasing position adjacent said output station means and movable therebetween, said carriage assembly means comprising;
   (1) a carriage frame means defining a vacuum chamber means therewithin, said carriage frame means further defining a vacuum opening means therein in fluid flow communication with respect to said vacuum chamber means for applying a vacuum thereto, said carriage frame means further defining a blowback opening means therein in fluid flow communication with respect to said vacuum chamber means for selectively supplying air thereinto, said carriage frame means further defining a pick-up outlet means in fluid flow communication with said vacuum chamber means to facilitate pick up of horizontal lid members therebelow within said input station means and release of horizontal lid members within said output station means therebelow;
   (2) a plurality of guide members secured to said carriage frame means and extending generally laterally outwardly therefrom into said upper slot means and said lower slot means defined in said carriage guide plate means for engagement therewithin to facilitate guiding of movement of said carriage assembly means between said pick-up position adjacent said input station means and said releasing position adjacent said output station means;
   (3) a vacuum cup means secured to said pick-up outlet means defined in said carriage frame means to facilitate gripping a horizontal lid member therebelow responsive to abutment therewith and application of a vacuum to said vacuum opening means, said vacuum cup means being formed of a flexibly resilient material to facilitate abutment and gripping with a horizontal lid member positioned therebelow;
   (4) a carriage bracket means extending upwardly from said carriage assembly means with at least one of said guide members secured to said carriage bracket means and extending outwardly therefrom to facilitate guiding of selective movement of said carriage assembly means between said pick-up position and said releasing position, each of said guide members secured to said carriage bracket means being positioned to extend into said upper slot means and all other of said guide members being positioned to extend into said lower slot means to facilitate guiding of movement of said carriage assembly means between said pick-up position and said releasing position;
D. a main drive means operatively secured to said carriage assembly means to urge selective movement thereof between said pick-up position adjacent said input station means and said releasing position adjacent said output station means, said main drive means including a main hydraulic piston means operative to selectively facilitate movement of said carriage assembly means between said input station means and said output station means;
E. a lifting platform means mounted within said input station means of said main frame means and being vertically movable therewithin between a lower platform position adapted to receive stacks of horizontal lid members and an upper platform position adjacent said carriage assembly means to facilitate removal of lid members singly from a stack thereof;
F. a stack securement means mounted to said frame means and positioned adjacent said input station means, said stack securement means being operative to selectively retain a stack of horizontal lid members below the uppermost lid thereon downwardly with respect to said lifting platform means therebelow, said stack securement means comprising;
   (1) a clamping driveshaft means rotatably mounted with respect to said main frame means;
   (2) a clamping arm means fixedly secured to said clamping driveshaft means in order to be pivotably movable therewith with respect to said main frame means, said clamping arm means being movable to a clamping position within said input station means in abutment with all lid members within a stack thereof below the top lid member positioned upon said lifting platform means, said clamping arm means also being movable to a retracted position spatially disposed from any horizontal lid members positioned upon said lifting platform means within said input station means to allow movement thereof and to allow vertical movement of said lifting platform means;
   (3) a clamping arm drive means operatively secured to said clamping driveshaft means for urging rotational movement thereof to cause movement of said clamping arm means selectively to the clamping position with said clamping arm means in abutment with a stack of horizontal lid members for holding thereof, said clamping arm drive means also being operatively secured to said clamping driveshaft means for urging rotational movement thereof to cause movement of said clamping arm means selectively to the retracted position with said clamping arm means withdrawn from said input station means and remotely positioned with respect to any horizontal lid member positioned therewithin, said clamping arm drive means including a clamping hydraulic piston means operative to selectively urge movement of said clamping arm means between said clamping position and said retracted position;
G. a vacuum line means attached to said vacuum opening means to be in fluid flow communication therewith and adapted to selectively provide a vacuum thereto responsive to said vacuum cup means moving to said pick-up position within said input station means and into abutment with a horizontal lid member therein, said vacuum line means being operable to cease applying of a vacuum to said vacuum opening means responsive to movement of said carriage assembly means to said releasing position within said output station means to facilitate release of a horizontal lid; and
H. a blowback line means attached to said blowback opening means to be in fluid flow communication therewith and adapted to selectively provide pressurized air thereto responsive to movement of said carriage assembly means to said releasing position within said output station means to facilitate release of a horizontal lid member.

20. An apparatus for automatically unstacking horizontal lid members from a vertically extending stack thereof comprising:
A. a main frame means defining an input station means and an output station means therein, said input station means being adapted to receive stacks of horizontal lid members for separation and movement thereof singly to said output station means;
B. a carriage guide plate means fixedly secured to said main frame means and mounted extending generally vertically therein, said carriage guide plate means defining an upper slot means and a lower slot means extending therealong between said input station means and said output station means, said upper slot means and said lower slot means extending parallel with respect to one another within said carriage guide plate means, each of said upper slot means including an upper horizontal slot segment and an upper oblique slot segment connected to said upper horizontal slot segment and extending downwardly and outwardly therefrom adjacent said input station means, each of said lower slot means including a lower horizontal slot segment and a lower oblique slot segment connected to said lower horizontal slot segment and extending downwardly and outwardly therefrom adjacent said input station means, said upper slot means and said lower slot means having the same configuration spatially disposed from one another to facilitate guiding of movement therewith;

C. a carriage assembly means movably mounted within said carriage guide plate means between a pick-up position adjacent said input station means and a releasing position adjacent said output station means and movable therebetween, said carriage assembly means comprising;
  (1) a carriage frame means defining a vacuum chamber means therewithin, said carriage frame means further defining a vacuum opening means therein in fluid flow communication with respect to said vacuum chamber means for applying a vacuum thereto, said carriage frame means further defining a blowback opening means therein in fluid flow communication with respect to said vacuum chamber means for selectively supplying air thereinto, said carriage frame means further defining a pick-up outlet means in fluid flow communication with said vacuum chamber means to facilitate pick up of horizontal lid members therebelow within said input station means and release of horizontal lid members within said output station means therebelow;
  (2) a plurality of guide members secured to said carriage frame means and extending generally laterally outwardly therefrom into said upper slot means and said lower slot means defined in said carriage guide plate means for engagement therewithin to facilitate guiding of movement of said carriage assembly means between said pick-up position adjacent said input station means and said releasing position adjacent said output station means;
  (3) a vacuum cup means secured to said pick-up outlet means defined in said carriage frame means to facilitate gripping a horizontal lid member therebelow responsive to abutment therewith and application of a vacuum to said vacuum opening means, said vacuum cup means being formed of a flexibly resilient material to facilitate abutment and gripping with a horizontal lid member positioned therebelow;
  (4) a carriage bracket means extending upwardly from said carriage assembly means with at least one of said guide members secured to said carriage bracket means and extending outwardly therefrom to facilitate guiding of selective movement of said carriage assembly means between said pick-up position and said releasing position, each of said guide members secured to said carriage bracket means being positioned to extend into said upper slot means and all other of said guide members being positioned to extend into said lower slot means to facilitate guiding of movement of said carriage assembly means between said pick-up position and said releasing position;

D. a main drive means operatively secured to said carriage assembly means to urge selective movement thereof between said pick-up position adjacent said input station means and said releasing position adjacent said output station means, said main drive means including a main hydraulic piston means operative to selectively facilitate movement of said carriage assembly means between said input station means and said output station means;

E. a lifting platform means mounted within said input station means of said main frame means and being vertically movable therewithin between a lower platform position adapted to receive stacks of horizontal lid members and an upper platform position adjacent said carriage assembly means to facilitate removal of lid members singly from a stack thereof;

F. a stack securement means mounted to said frame means and positioned adjacent said input station means, said stack securement means being operative to selectively retain a stack of horizontal lid members below the uppermost lid thereon downwardly with respect to said lifting platform means therebelow, said stack securement means comprising;
  (1) a clamping driveshaft means rotatably mounted with respect to said main frame means;
  (2) a clamping arm means fixedly secured to said clamping driveshaft means in order to be pivotably movable therewith with respect to said main frame means, said clamping arm means being movable to a clamping position within said input station means in abutment with all lid members within a stack thereof below the top lid member positioned upon said lifting platform means, said clamping arm means also being movable to a retracted position spatially disposed from any horizontal lid members positioned upon said lifting platform means within said input station means to allow movement thereof and to allow vertical movement of said lifting platform means;
  (3) a plurality of rubber gripping members fixedly secured to said clamping arm means and adapted to be moved into abutment with a stack of horizontal lid members for facilitating gripping thereof by said clamping arm means responsive to movement thereof into said clamping position within said input station means;
  (4) a clamping arm drive means operatively secured to said clamping driveshaft means for urging rotational movement thereof to cause movement of said clamping arm means selectively to the clamping position with said clamping arm means in abutment with a stack of horizontal lid members for holding thereof, said clamping arm drive means also being operatively secured to said clamping driveshaft means for urging rotational movement thereof to cause movement of said clamping arm means selectively to the retracted position with said clamping arm means withdrawn from said input station means and remotely positioned with respect to any horizontal lid member positioned therewithin, said clamping arm drive means including a clamping hydraulic piston means operative to selectively urge movement of said clamping arm means between said clamping position and said retracted position;

G. a vacuum line means attached to said vacuum opening means to be in fluid flow communication therewith and adapted to selectively provide a vacuum thereto responsive to said vacuum cup means moving to said pick-up position within said input station means and into abutment with a horizontal lid member therein, said vacuum line means being operable to cease applying of a vacuum to said vacuum opening means responsive to movement of said carriage assembly means to said releasing position within said output station means to facilitate release of a horizontal lid;

H. a blowback line means attached to said blowback opening means to be in fluid flow communication therewith and adapted to selectively provide pressurized air thereto responsive to movement of said carriage assembly means to said releasing position within said output station means to facilitate release of a horizontal lid member;

I. an output guide means positioned adjacent said output station means to guide movement of horizontal lid members released therewithin, said output guide means defining a V-shaped receiving slot means for receiving horizontal lid members released thereabove from said carriage assembly means when positioned in said releasing position, said output guide means comprising:

(1) a primary inclined guide wall means including an upper edge means thereof positioned at said output station means below said carriage assembly means for causing tilting of a horizontal lid member released therefrom within said output station means, said upper edge means positioned below said releasing position to facilitate receiving of a horizontal lid member after release thereabove into said V-shaped receiving slot means, said primary inclined guide wall means and said upper edge means being oriented perpendicularly with respect to the direction of movement of said carriage assembly means moving between said pick-up position and said releasing position in order to facilitate exiting of a horizontal lid member from said output station means perpendicularly with respect thereto; and (2) a secondary inclined guide wall means spatially disposed from said primary inclined guide wall means to form said V-shaped receiving slot means therebetween, said secondary inclined guide wall means also being oriented perpendicularly with respect to the direction of movement of said carriage assembly means moving between said pick-up position and said releasing position in order to facilitate exiting of a horizontal lid member from said output station means perpendicularly with respect thereto.

* * * * *